Sept. 27, 1960 R. LUCIEN 2,954,223
MIXED SUSPENSION FOR VEHICLES
Filed Dec. 23, 1957 2 Sheets-Sheet 1

United States Patent Office 2,954,223
Patented Sept. 27, 1960

2,954,223

MIXED SUSPENSION FOR VEHICLES

Rene Lucien, Neuilly-sur-Seine, France, assignor to Recherches Etudes Production R.E.P., Paris, France Filed Dec. 23, 1957, Ser. No. 704,678

Claims priority, application France Nov. 26, 1957

3 Claims. (Cl. 267—64)

The present invention relates to mixed suspension systems for automobile vehicles.

A mixed suspension system may, for example, combine the damping effect resulting from viscosity forces developed in a thin, stable and continuous film of liquid with the action of compressed air; the passage of the liquid from one chamber of a shock-absorber to another chamber may be prevented by means of a fluid-tight connection between a cylinder and casing comprised by the shock-absorber. This type of shock-absorber is essentially distinct from those in which the damping effect results from the passage of a liquid through narrow orifices from one chamber of a cylinder to the other.

The damping effect obtained in conventional suspension systems is in principle proportional to the relative speed of movement of the coupled members; in practice, however, a curve (as will be shown) representing damping force as a function of the speed of the moving element of the shock-absorber is not so correlated for high speeds and shows a clear reduction in the damping effect. In order to obtain an adequate damping effect at high speeds, it becomes necessary to increase the effectiveness of the shock-absorber, which in turn has the result of generating excessive damping forces for low speeds. In practice, a solution is sought which consists of a compromise between these two drawbacks.

The present invention has for an object the provision of a mixed suspension system which provides a remedy for these disadvantages. This improved system is distinguished from that referred to above by the fact that it combines in the interior of a single shock-absorber body the damping effect resulting from viscosity forces and the effect of a kinetic pneumatic damping type which employs the compressed air of a pneumatic suspension as controlled by the oscillatory movements of a vehicle which force the air to pass through a narrow retarding orifice. The damping which results from this second effect is proportional to the square of the speed of the moving part and permits of a compensation at high speeds for the insufficiency of the damping due to the action of the viscosity forces alone. It is possible to regulate these two damping effects in such manner that their sum is practically proportional to the speed, within the limits obtained in vehicles.

This system can provide, by itself, for the suspension of an automobile vehicle. It constitutes an economic and simple solution which can be adapted to existing vehicles. It can also be employed with conventional types of spring suspensions. In this latter case, the adjustment of the suspension is obtained by the choice of the strength of the springs, on the one hand, and, on the other hand, by the initial pressure of the compressed air as a function of the various loads applied to the vehicle. This adjustment or regulation may be such that the frequency of the oscillations is perfectly constant and independent of the load, and that its value corresponds to maximum comfort, the frequency being regulated for example to 1.25.

The invention is illustrated in the accompanying drawings in which.

Figure 2:
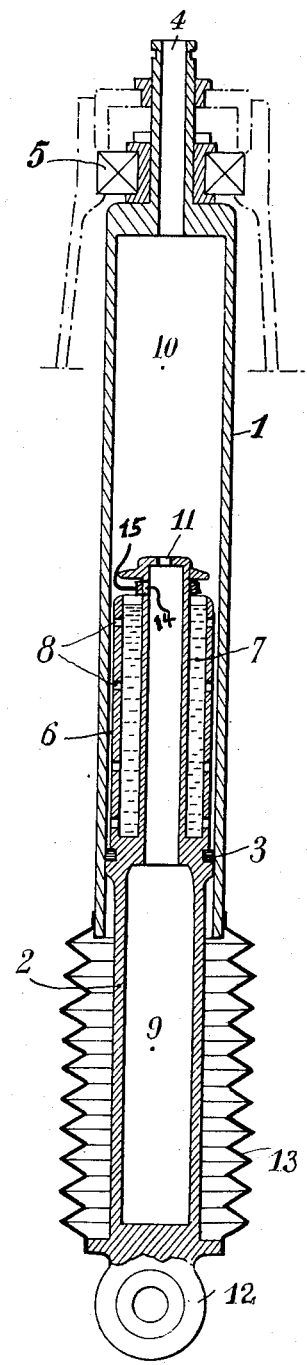
Fig. 2 shows a view in longitudinal axial cross-section of the shock-absorber of the invention.

Referring now to Fig. 2, in the cylindrical body 1 of the shock-absorber is movably mounted a sliding rod 2 provided with fluid-tight packings 3. The material forming this sliding rod should provide a thermostatic correction by differential expansion with the cylinder. The rod is, for example, made of magnesium and the cylinder of steel. At the upper end of the cylinder, a tubular member 4 puts the cylinder in communication with an accumulator (not shown) which provides the initial pressure for the shock-absorber. On this tube is fixed for example the upper fixing member 5 of the shock-absorber.

An annular space 6 of a few hundredths of a millimeter is provided between the cylinder and the sliding rod; in the latter is formed an annular chamber 7 which is filled with a suitable viscous liquid.

This liquid continuously fills the annular clearance 6 by means of small re-filling orifices 8 which pass through the wall of the rod and provide a communication for the liquid mass of 7 with the space 6. The thin and continuous viscous film thus maintained in this space insures the damping of the oscillations in both directions.

Inside the sliding rod 2 is formed an air or gas chamber 9. This latter communicates with the air or gas chamber 10 above the sliding rod through a retarding orifice 11. During oscillations in both directions, the compressed air passes through this orifice, thus producing a damping effect proportional to the square of the speed of relative movement between elements 1 and 2.

The lower part 12 of the sliding rod is coupled for example to the axle of the vehicle.

The body 1 of the shock-absorber is coupled to the lower portion of the sliding rod by a flexible sheath 13 of rubber, for example, forming a bellows.

This sheath protects the interior of the device against the penetration of mud, dust and against the action of all external agents.

In the shock-absorber system thus obtained, the viscous braking effect is regulated by the choice of the viscosity of the liquid employed, and the kinetic pneumatic braking by the dimensions of the braking orifice 11. As far as the pressure of air or gas is concerned, this is generally fixed by a regulation device (not shown).

Figure 1:
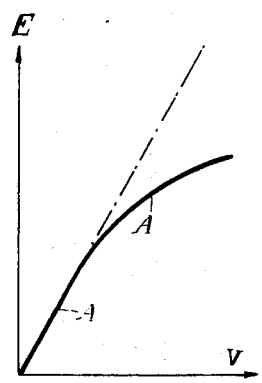
Fig. 1 shows a damping curve A for a conventional installation, with speed V of the moving element of a shock-absorber plotted as the abscissa and damping force as the ordinate.
Figure 3:
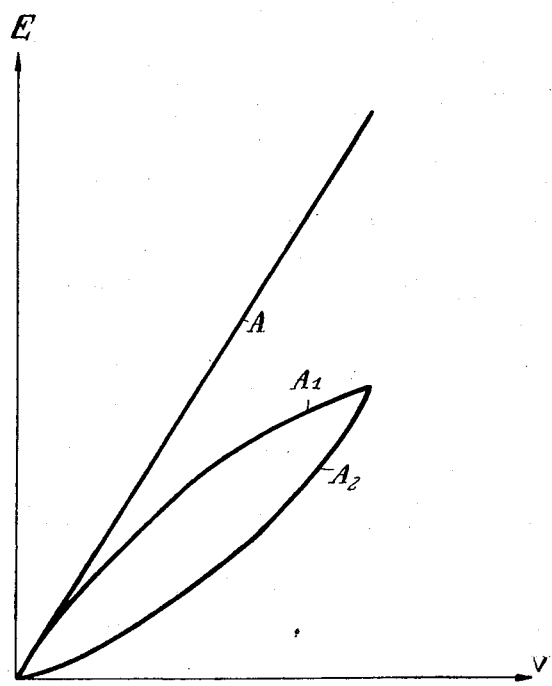
Fig. 3 is the response curve of the structure of Fig. 2.

Fig. 3 shows the response curve A corresponding to the total damping effect of the improved construction as a function of the above-noted speed. This curve is approximately a straight line and is the resultant of the viscous damping effect and the pneumatic damping, shown respectively by the curves $A_1$ and $A_2$.

There is thus obtained a damping effect which is sufficient at high speeds, while at the same time it is satisfactory for low speeds.

The damping effect may be improved if it is desired to obtain an asymmetric pneumatic damping effect, by incorporating in the system means by which the cross-section of passage available to the compressed air is greater in one direction of movement of the rod 2 than in the opposite direction. This can be done, for example, by providing a small lateral port 14 and a one way valve, such as an elastic band 15 closing the port 14.

What I claim is:

1. A shock absorber comprising a cylinder, a rod having one end extending into said cylinder, said rod being slidable in said cylinder and defining therewith an annular space, a fluid tight packing in said space between said cylinder and rod and spaced from said end of the latter, said rod including a reservoir and being provided with orifices between said end and said packing, the orifices coupling said reservoir to said annular space, and a stable viscous fluid in said reservoir, said fluid passing through said orifices to said annular space to form a continuous film therein, said rod being provided with a chamber for a pneumatic medium, said chamber being independent of said reservoir, said rod having an opening coupling said chamber to said cylinder for passage of the pneumatic medium therebetween.

2. A shock absorber as claimed in claim 1 wherein the opening coupling said chamber and cylinder is provided in the end of said rod.

3. A shock absorber as claimed in claim 1 comprising a one-way valve in said rod further coupling said chamber to said cylinder.

References Cited in the file of this patent

UNITED STATES PATENTS

| | | |
|---|---|---|
| 1,984,144 | Laugaudin | Dec. 11, 1934 |
| 2,197,474 | Johnson | Apr. 16, 1940 |
| 2,506,726 | Magrum | May 9, 1950 |
| 2,642,278 | Westcott | June 16, 1953 |
| 2,721,074 | De Carbon | Oct. 18, 1955 |
| 2,866,633 | Schnitzer | Dec. 30, 1958 |

FOREIGN PATENTS

| | | |
|---|---|---|
| 435,361 | Great Britain | Sept. 19, 1935 |